(12) United States Patent
Naiki et al.

(10) Patent No.: US 10,836,885 B2
(45) Date of Patent: Nov. 17, 2020

(54) ANTI-VIBRATION RUBBER COMPOSITION AND ANTI-VIBRATION RUBBER MEMBER

(71) Applicant: Sumitomo Riko Company Limited, Komaki (JP)

(72) Inventors: Hiroaki Naiki, Komaki (JP); Norihito Kimura, Komaki (JP)

(73) Assignee: SUMITOMO RIKO COMPANY LIMITED, Komaki (JP)

(*) Notice: Subject to any disclaimer, the term of this patent is extended or adjusted under 35 U.S.C. 154(b) by 47 days.

(21) Appl. No.: 16/434,368

(22) Filed: Jun. 7, 2019

(65) Prior Publication Data

US 2019/0284373 A1   Sep. 19, 2019

Related U.S. Application Data

(63) Continuation of application No. PCT/JP2017/043250, filed on Dec. 1, 2017.

(30) Foreign Application Priority Data

Jan. 27, 2017   (JP) ................. 2017-013312

(51) Int. Cl.
| | |
|---|---|
| C08L 9/00 | (2006.01) |
| C08K 3/013 | (2018.01) |
| C08K 3/04 | (2006.01) |
| C08K 3/36 | (2006.01) |
| C08K 5/20 | (2006.01) |
| C08L 23/26 | (2006.01) |
| C08L 83/04 | (2006.01) |
| C08L 7/00 | (2006.01) |
| C08L 51/06 | (2006.01) |
| F16F 1/36 | (2006.01) |
| F16F 15/08 | (2006.01) |

(52) U.S. Cl.
CPC ............. *C08L 9/00* (2013.01); *C08K 3/013* (2018.01); *C08K 3/04* (2013.01); *C08K 3/36* (2013.01); *C08K 5/20* (2013.01); *C08L 7/00* (2013.01); *C08L 23/26* (2013.01); *C08L 51/06* (2013.01); *C08L 83/04* (2013.01); *C08K 2201/006* (2013.01); *C08L 2205/03* (2013.01); *F16F 1/36* (2013.01); *F16F 15/08* (2013.01)

(58) Field of Classification Search
CPC ........ C08L 9/00; C08L 23/26; C08L 2205/03; C08L 83/04; C08K 3/04; C08K 3/36; C08K 5/20; C08K 3/013; F16F 15/08
USPC ..................................... 524/495
See application file for complete search history.

(56) References Cited

U.S. PATENT DOCUMENTS

| | | | |
|---|---|---|---|
| 4,880,318 A | 11/1989 | Shibahara et al. | |
| 5,224,790 A | 7/1993 | Hein | |
| 5,984,283 A | 11/1999 | Tsuiki et al. | |
| 6,467,961 B2 | 10/2002 | Nakamaru et al. | |
| 9,033,320 B2 | 5/2015 | Nakamura et al. | |
| 2009/0269590 A1 | 10/2009 | Furukawa et al. | |
| 2011/0031664 A1 | 2/2011 | Nakamura et al. | |
| 2011/0170814 A1 | 7/2011 | Nakamura et al. | |
| 2013/0285298 A1 | 10/2013 | Nakamura et al. | |

FOREIGN PATENT DOCUMENTS

| | | |
|---|---|---|
| EP | 0 059 230 A1 | 9/1982 |
| GB | 2 317 434 A | 3/1998 |
| JP | 63-57311 A | 3/1988 |
| JP | 63-125541 A | 5/1988 |
| JP | 5-295187 A | 11/1993 |
| JP | 2000-198974 A | 7/2000 |
| JP | 2003-214431 A | 7/2003 |
| JP | 3648869 B2 | 5/2005 |
| JP | 2006-96830 A | 4/2006 |
| JP | 2006-273181 A | 10/2006 |
| JP | 2006-291019 A | 10/2006 |
| JP | 2010-143280 A | 7/2010 |
| JP | 5780639 B2 | 9/2015 |
| JP | 2017-137424 A | 8/2017 |
| WO | 2010/038746 A1 | 4/2010 |

OTHER PUBLICATIONS

International Search Report dated Feb. 13, 2018, issued in counterpart International Application No. PCT/JP2017/043250, with English Translation (4 pages).
Notification of Reasons for Refusal dated Feb. 26, 2019, issued in counterpart of Japanese Patent Application No. 2017-013312 (3 pages).
Notification of Transmittal of Translation of the International Preliminary Report on Patentabililty (Form PCT/IB/338) issued in counterpart International Application No. PCT/JP2017/043250 dated Aug. 8, 2019 with Forms PCT/IB/373 and PCT/ISA/237 (6 pages).

*Primary Examiner* — Hui H Chin
(74) *Attorney, Agent, or Firm* — Westerman, Hattori, Daniels & Adrian, LLP

(57) ABSTRACT

An anti-vibration rubber composition includes the following components (A) to (C) and a sliding agent, wherein the sliding agent includes the following component (D), and wherein a content of the component (C) with respect to 100 parts by weight of the component (A) falls within a range of from 0.1 parts by weight to 10 parts by weight: (A) a diene rubber; (B) carbon black; (C) a white filler; and (D) an organopolysiloxane-modified polypropylene. The anti-vibration rubber composition can eliminate a reduction in sliding property due to a temperature environment or continuous use, and can effectively suppress an increase in frictional resistance against a mating member.

8 Claims, No Drawings

ANTI-VIBRATION RUBBER COMPOSITION AND ANTI-VIBRATION RUBBER MEMBER

RELATED APPLICATION

This application is a continuation of International Application No. PCT/JP2017/043250, filed on Dec. 1, 2017, which claims priority to Japanese Patent Application No. 2017-013312, filed on Jan. 27, 2017, the entire contents of each of which is hereby incorporated by reference.

TECHNICAL FIELD

The present disclosure relates to an anti-vibration rubber composition and anti-vibration rubber member to be used in an anti-vibration application for, for example, a vehicle, such as an automobile or a train, and more specifically, to an anti-vibration rubber composition and anti-vibration rubber member to be used for a member required to have a sliding property, such as a stabilizer bush.

BACKGROUND ART

A stabilizer bush, a suspension bush, an engine mount stopper, a coil spring sheet, or the like serving as an anti-vibration rubber member for a vehicle, such as an automobile, includes a sliding contact portion configured to be brought into sliding contact with a mating member (e.g., a metal shaft). The sliding contact portion of the anti-vibration rubber member is generally formed of a diene rubber in order to enhance an anti-vibration property. However, when the rubber has a large friction coefficient, there arises, for example, a concern that an abnormal noise (stick-slip noise) may be generated at the time of sliding to degrade ride comfort of the vehicle. Therefore, hitherto, a product obtained by kneading a sliding agent, such as a fatty acid amide, into a diene rubber composition for such use, and vulcanizing the resultant composition has been used for the sliding contact portion. That is, with this, the sliding agent precipitates (bleeds) between the sliding contact portion and the mating member to form a film, thereby being able to express a self-sliding property (see, for example, PTLs 1 to 3).

RELATED ART DOCUMENT

Patent Document

PTL 1: JP-B2-3648869
PTL 2: JP-A-2010-143280
PTL 3: JP-B2-5780639

SUMMARY

However, the above-mentioned film formed by the related-art sliding agent, such as a fatty acid amide, is not chemically bonded to the surface of a vulcanized rubber, but merely physically adheres thereto, and hence is liable to be scraped off through sliding with a mating member. In addition, the related-art sliding agent is liable to liquefy when the temperature of a use environment is increased, and this serves as a factor for a reduction in sliding property. Further, under a low-temperature environment, the speed at which the sliding agent precipitates on the surface of the vulcanized rubber is liable to be reduced, and hence the sliding property is difficult to express. For those reasons, in a technique involving kneading the sliding agent into a rubber composition, there still remains a problem in that the sliding property is liable to be reduced owing to a temperature environment or continuous use of the anti-vibration rubber member.

As a technique for solving the above-mentioned problem, there has also been considered a technique involving forming a coating layer of a solid lubricant or a sliding layer having polytetrafluoroethylene fibers woven thereinto on the surface of the vulcanized rubber without kneading the sliding agent into the rubber composition. However, the formation of any such layer has a problem in that production steps are complicated by, for example, requiring a baking step. In addition, the thus formed layer also has a drawback of being liable to be peeled off owing to friction during continuous use.

The present disclosure has been made in view of such circumstances, and provides an anti-vibration rubber composition and an anti-vibration rubber member each of which can eliminate a reduction in sliding property due to a temperature environment or continuous use, and can effectively suppress an increase in frictional resistance against a mating member.

According to a first aspect of the present disclosure, there is provided an anti-vibration rubber composition, including the following components (A) to (C) and a sliding agent, wherein the sliding agent includes the following component (D), and wherein a content of the component (C) with respect to 100 parts by weight of the component (A) falls within a range of from 0.1 parts by weight to 10 parts by weight:

(A) a diene rubber;
(B) carbon black;
(C) a white filler; and
(D) an organopolysiloxane-modified polypropylene.

According to a second aspect of the present disclosure, there is also provided an anti-vibration rubber member, including a sliding contact portion configured to be brought into sliding contact with a mating member, wherein at least the sliding contact portion is formed of a vulcanized body of the anti-vibration rubber composition of the first aspect.

That is, in the case of using only the related-art sliding agent, such as a fatty acid amide, for a diene rubber serving as a polymer of an anti-vibration rubber composition, a reduction in sliding property due to a temperature environment or continuous use is liable to be caused. In view of this, the inventors have made investigations on the use of a novel sliding agent, which differs from the related-art sliding agent that enhances sliding performance through bleeding. In the course of the investigations, the inventors used the organopolysiloxane-modified polypropylene (D) by kneading the organopolysiloxane-modified polypropylene (D) into the diene rubber composition. As a result, the inventors have ascertained that the organopolysiloxane-modified polypropylene (D) is dispersed in the polymer as an elastomer component. The polypropylene moiety of the organopolysiloxane-modified polypropylene (D) undergoes a crosslinking reaction with the diene rubber and the polysiloxane moiety of the organopolysiloxane-modified polypropylene (D) is aligned with respect to the surface of a vulcanized body of the diene rubber composition. Hence the entirety of the vulcanized body shows an excellent property in sliding property and the degradation of the sliding property due to wear can also be eliminated. Further, the inventors have ascertained that, when the white filler (C), such as silica, is blended into the diene rubber composition, by virtue of good affinity between the polysiloxane moiety of the organopolysiloxane-modified polypropylene (D) and the white filler (C), the dispersibility of the organopolysiloxane-modified polypropylene (D) is enhanced to provide satisfactory sliding performance. When the white filler (C) is blended in a specific amount, satisfactory sliding performance is obtained without causing a reduction in sliding property due to a temperature environment or continuous use and the deterioration of a dynamic-to-static modulus ratio in the anti-vibration rubber member. The inventors have found that the desired object can be achieved as a result of the foregoing, and have thus achieved the present disclosure.

As described above, the anti-vibration rubber composition of the present disclosure contains the diene rubber (A), the carbon black (B), and the white filler (C), and the organopolysiloxane-modified polypropylene (D), and contains the white filler (C) in the range of from 0.1 parts by weight to 10 parts by weight with respect to 100 parts by weight of the diene rubber (A). Accordingly, a reduction in sliding property due to a temperature environment or continuous use can be eliminated without causing the deterioration of the dynamic-to-static modulus ratio, and an increase in frictional resistance against a mating member can be effectively suppressed. In addition, the anti-vibration rubber member including the sliding contact portion formed of the vulcanized body of the anti-vibration rubber composition of the present disclosure can be suitably used as an anti-vibration rubber member required to have a sliding property, such as a stabilizer bush, suspension bush, engine mount stopper, or coil spring sheet to be used for a vehicle, such as an automobile. Any such anti-vibration rubber member can eliminate a problem in that, for example, an abnormal noise (stick-slip noise) is generated at the time of sliding to degrade the ride comfort of the vehicle.

Particularly when the organopolysiloxane-modified polypropylene (D) is an organopolysiloxane-modified polypropylene obtained through chemical bonding between a polypropylene resin and an organopolysiloxane having a radically polymerizable functional group, the sliding property becomes excellent. Further, when the organopolysiloxane-modified polypropylene (D) is an organopolysiloxane-modified polypropylene obtained through chemical bonding between each of a polypropylene resin and a polypropylene wax, and an organopolysiloxane having a radically polymerizable functional group, the sliding property becomes more excellent.

In addition, when the organopolysiloxane-modified polypropylene (D) is an organopolysiloxane-modified polypropylene having a melting point of 150° C. or less, the dispersibility of the organopolysiloxane-modified polypropylene (D) in the diene rubber (A) serving as a polymer is further enhanced, and the sliding property becomes more excellent.

In addition, when the anti-vibration rubber composition further contains an unsaturated fatty acid amide in addition to the components (A) to (D), in particular, initial sliding performance can be effectively improved.

Further, when the white filler (C) is silica, the dispersibility of the organopolysiloxane-modified polypropylene (D) is further enhanced, and more satisfactory sliding performance can be obtained without causing the deterioration of the dynamic-to-static modulus ratio.

In addition, when the white filler (C) has a BET specific surface area in the range of from 15 $m^2$/g to 250 $m^2$/g, an increase in dynamic friction coefficient caused by repeatedly performing sliding can be further suppressed.

DESCRIPTION OF EMBODIMENTS

Next, an embodiment of the present disclosure is described in detail.

As described above, an anti-vibration rubber composition of the present disclosure contains a diene rubber (A), carbon black (B), and a white filler (C), and an organopolysiloxane-modified polypropylene (D), and contains the white filler (C) in the range of from 0.1 parts by weight to 10 parts by weight with respect to 100 parts by weight of the diene rubber (A).

[Diene Rubber (A)]

Examples of the diene rubber (A) include a natural rubber (NR), a butadiene rubber (BR), a styrene-butadiene rubber (SBR), a chloroprene rubber (CR), an isoprene rubber (IR), and an acrylonitrile-butadiene rubber (NBR). These rubbers may be used alone or in combination thereof. Of these, a natural rubber is suitably used in terms of strength and a lower dynamic-to-static modulus ratio.

[Carbon Black (B)]

Next, as the carbon black (B), there maybe used, for example, carbon blacks of various grades, such as SAF grade, ISAF grade, HAF grade, MAF grade, FEF grade, GPF grade, SRF grade, FT grade, and MT grade. These carbon blacks may be used alone or in combination thereof.

In addition, the blending amount of the carbon black (B) falls within preferably the range of from 20 parts by weight to 100 parts by weight, particularly preferably the range of from 30 parts by weight to 80 parts by weight with respect to 100 parts by weight of the diene rubber (A) serving as a polymer. That is, such range is adopted because of the following reasons: when the blending amount of the carbon black (B) is excessively small, a certain level of reinforceability cannot be satisfied; and in contrast, when the blending amount of the carbon black (B) is excessively large, a problem, such as an increase in dynamic-to-static modulus ratio or the deterioration of processability due to an increase in viscosity, occurs.

[White Filler (C)]

In addition, examples of the white filler (C) include silica, clay, calcium carbonate, talc, mica, sericite, and montmorillonite. These fillers may be used alone or in combination thereof. Of these, silica is preferred because the dispersibility of the organopolysiloxane-modified polypropylene (D) is further enhanced, and more satisfactory sliding performance can be obtained without causing the deterioration of the dynamic-to-static modulus ratio.

As the silica, there maybe used, for example, wet silica, dry silica, and colloidal silica. In addition, these silicas may be used alone or in combination thereof.

In addition, the BET specific surface area of the white filler (C) preferably falls within the range of from 15 $m^2$/g to 250 $m^2$/g because an increase in dynamic friction coefficient caused by repeatedly performing sliding can be further suppressed, and more preferably falls within the range of from 60 $m^2$/g to 230 $m^2$/g from a similar viewpoint. The BET specific surface area of the white filler (C) may be measured, for example, with a BET specific surface area measurement apparatus (manufactured by Micro Data Co., Ltd., 4232-II) using a mixed gas ($N_2$: 70%, He: 30%) as an adsorbate gas after a sample has been degassed at 200° C. for 15 minutes.

In addition, the blending amount of the white filler (C) falls within the range of from 0.1 parts by weight to 10 parts by weight as described above, preferably the range of from 1 part by weight to 8 parts by weight with respect to 100 parts by weight of the diene rubber (A) serving as the polymer. That is, such range is adopted because of the following reasons: when the blending amount of the white filler (C) is excessively small, the enhancing effect on the dispersibility of the organopolysiloxane-modified polypropylene (D) is not obtained, and there is a risk of causing a reduction in sliding property of an anti-vibration rubber member due to a temperature environment or continuous use; and in contrast, when the blending amount of the white filler (C) is excessively large, there is a risk of causing the deterioration of the dynamic-to-static modulus ratio in the anti-vibration rubber member.

[Organopolysiloxane-Modified Polypropylene (D)]

Particularly when the organopolysiloxane-modified polypropylene (D) is a bonded body (grafted body) obtained through chemical bonding (grafting) between a polypropylene resin and an organopolysiloxane having a radically polymerizable functional group, the molecular weight of the organopolysiloxane-modified polypropylene can be controlled to a preferred one, and hence the sliding property is enhanced.

In addition, when the organopolysiloxane-modified polypropylene (D) is an organopolysiloxane-modified polypropylene obtained through chemical bonding between each of a polypropylene resin and a polypropylene wax, and an organopolysiloxane having a radically polymerizable functional group, the sliding property becomes more excellent.

The polypropylene resin serving as a constituent material for the organopolysiloxane-modified polypropylene (D) is a resin formed of: a homopolymer of propylene; a copolymer, such as a block copolymer, a random copolymer, or a graft copolymer, of an α-olefin other than propylene, such as ethylene or butene-1, and propylene; or a mixture thereof. Of these polypropylene resins, a polypropylene resin of a random copolymer is preferred because its low melting point contributes to lowering the melting point of the organopolysiloxane-modified polypropylene (D), to thereby contribute to enhancing the compatibility of the organopolysiloxane-modified polypropylene (D) with respect to the diene rubber (A) serving as the polymer.

The polypropylene resin is obtained by synthesis involving polymerizing the corresponding monomer(s) using any of various catalysts, such as a Ziegler-Natta catalyst and a metallocene catalyst. Of these, a polypropylene resin synthesized using a metallocene catalyst is preferred because its melting point, which is lower than those of polypropylene resins synthesized with other catalysts, contributes to lowering the melting point of the organopolysiloxane-modified polypropylene (D), to thereby contribute to enhancing the compatibility of the organopolysiloxane-modified polypropylene (D) with respect to the diene rubber (A) serving as the polymer. Commercially available examples of the polypropylene resin synthesized using the metallocene catalyst include metallocene random polypropylenes, such as WINTEC WFX4T manufactured by Japan Polypropylene Corporation, and Prime Polypro MF257 manufactured by Prime Polymer Co., Ltd.

In addition, as the polypropylene wax to be used in combination with the polypropylene resin, one obtained by polymerizing propylene or depolymerizing general high-molecular-weight polypropylene is used. The weight-average molecular weight of the polypropylene wax preferably falls within the range of from 1,000 to 20,000. Commercially available examples of such low-molecular-weight polypropylene wax include: VISCOL330-P, VISCOL 440-P, VISCOL 550-P, and VISCOL 660-P manufactured by Sanyo Chemical Industries, Ltd.; Hi-WAXNP055, Hi-WAXNP105, Hi-WAXNP505, and Hi-WAX NP805manufactured by Mitsui Chemicals, Inc.; and Lico-wax PP230 manufactured by Clariant.

When the polypropylene resin and the polypropylene wax are used in combination as described above, their blending ratio is preferably as follows in terms of weight ratio: polypropylene resin:polypropylene wax=99:1 to 40:60. The blending ratio more preferably falls within the range of polypropylene resin:polypropylene wax=90:10 to 45:55, still more preferably the range of polypropylene resin: polypropylene wax=80:20 to 50:50. The combined use of the polypropylene wax in such range decreases the melt viscosity of the organopolysiloxane-modified polypropylene (D), to thereby contribute to enhancing the compatibility of the organopolysiloxane-modified polypropylene (D) with respect to the diene rubber (A) serving as the polymer, and hence is preferred.

In addition, among the organopolysiloxanes each serving as a constituent material for the organopolysiloxane-modified polypropylene (D), the backbone of the organosiloxane having a radically polymerizable functional group may be any of linear, branched, and cyclic ones, or may be a mixture thereof. Examples of the organopolysiloxane include a polydimethylsiloxane with both terminals blocked with dimethylvinylsiloxy groups, a dimethylsiloxane-methylsiloxane copolymer with both terminals blocked with dimethylvinylsiloxy groups, a polymethylvinylsiloxane with both terminals blocked with trimethylsiloxy groups, a dimethylsiloxane-methylvinylsiloxane copolymer with both terminals blocked with trimethylsiloxy groups, a polydimethylsiloxane with both terminals blocked with dimethylhexenylsiloxy groups, a dimethylsiloxane-methylhexenylsiloxane copolymer with both terminals blocked with dimethylhexenylsiloxy groups, a polymethylhexenylsiloxane with both terminals blocked with trimethylsiloxy groups, and a dimethylsiloxane-methylhexenyl copolymer with both terminals blocked with trimethylsiloxy groups.

The radically polymerizable functional group is a functional group that has a carbon-carbon double bond and can be radically polymerized, and examples thereof include an acryloxymethyl group, a 3-acryloxypropyl group, a methacryloxymethyl group, a 3-methacryloxypropyl group, a 4-vinylphenyl group, a 3-vinylphenyl group, a 4-(2-propenyl)phenyl group, a 3-(2-propenyl)phenyl group, a2-(4-vinylphenyl)ethyl group, a 2-(3-vinylphenyl)ethyl group, a vinyl group, a propenyl group, a butenyl group, a pentenyl group, a hexenyl group, and a decenyl group. The organopolysiloxane has at least one of these radically polymerizable functional groups, and an organopolysiloxane having a vinyl group is preferred because of being easy to synthesize or obtain.

The organopolysiloxane may have, in addition to the radically polymerizable functional group, for example, the following functional group: an alkyl group, such as a methyl group, an ethyl group, a propyl group, a 3,3,3-trifluoropropyl group, or a 3-chloropropyl group; a cycloalkyl group, such as a cyclopentyl group or a cyclohexyl group; an aryl group, such as a phenyl group or a xylyl group; an aralkyl group, such as a benzyl group, a phenethyl group, or a 3-phenylpropyl group; an alkoxy group, such as a methoxy group, an ethoxy group, or a propoxy group; or a hydroxy group.

The kinematic viscosity at 25° C. of the organopolysiloxane falls within preferably the range of from 200 $mm^2/s$ to 1,000,000 $mm^2/s$, more preferably the range of from 500 $mm^2/s$ to 1,000,000 $mm^2/s$. That is, such range is adopted because the use of the organopolysiloxane showing such kinematic viscosity facilitates the synthesis of a desired organopolysiloxane-modified polypropylene (D).

As a method of synthesizing the organopolysiloxane-modified polypropylene (D), there is given, for example, a method involving heating and kneading the polypropylene resin and the polypropylene wax with the organopolysiloxane having a radically polymerizable functional group in the presence of an organic peroxide to chemically bond these materials to each other. The kneading is performed with a Banbury mixer, a kneader, a twin-screw stirrer, or the like.

Examples of the organic peroxide include: ketone peroxides, such as methyl ethyl ketone peroxide, methyl isobutyl ketone peroxide, and cyclohexanone peroxide; diacyl peroxides, such as isobutyryl peroxide, lauroyl peroxide, and benzoyl peroxide; hydroperoxides, such as diisopropylbenzene hydroperoxide; dialkyl peroxides, such as dicumyl peroxide, 2,5-dimethyl-2,5-di-(t-butylperoxy)hexane, 1,3-bis-(t-butylperoxy-isopropyl)-benzene, di-t-butyl peroxide, and 2,5-dimethyl-2,5-di-(t-butylperoxy)-hexane-3; peroxyketals, such as 1,1-di-t-butylperoxy-3,3,5-trimethylcyclohexane and 2,2-di-(t-butylperoxy)-butane; alkyl peresters, such as t-butyl peroxy-pivalate and t-butyl peroxybenzoate; and percarbonates, such as t-butyl peroxyisopropylcarbonate.

Commercially available examples of the organic peroxide include Luperox 101, Luperox DC, Luperox F, and Luperox DI manufactured by Arkema Yoshitomi, Ltd.

The blending amount of the organopolysiloxane having a radically polymerizable functional group in the synthesis of the organopolysiloxane-modified polypropylene (D) is preferably from 0.5 parts by weight to 200 parts by weight, more preferably from 2 parts by weight to 150 parts by weight, still more preferably from 10 parts by weight to 150 parts by weight with respect to 100 parts by weight of the total blending amount of the polypropylene resin and the polypropylene wax (when the polypropylene wax is not blended, the blending amount of only the polypropylene resin). In addition, the blending amount of the organic peroxide in the synthesis is preferably from 0.01 parts by weight to 30 parts by weight, more preferably 0.05 parts by weight to 3 parts by weight with respect to 100 parts by weight of the total blending amount of the polypropylene resin and the polypropylene wax (when the polypropylene wax is not blended, the blending amount of only the polypropylene resin). That is, such blending amount is adopted because it becomes easy to synthesize the desired organopolysiloxane-modified polypropylene (D).

The organopolysiloxane-modified polypropylene (D) thus obtained preferably has a melting point of 150° C. or less. In particular, the melting point is more preferably from 65° C. to 145° C., and the melting point is still more preferably from 85° C. to 135° C. That is, the organopolysiloxane-modified polypropylene having such melting point is adopted because the compatibility and dispersibility of the organopolysiloxane-modified polypropylene (D) with respect to the diene rubber (A) serving as the polymer are further enhanced, and the sliding property becomes more excellent.

In addition, the blending amount of the organopolysiloxane-modified polypropylene (D) preferably falls within the range of from 0.5 parts by weight to 30 parts by weight, more preferably the range of from 1 part by weight to 15 parts by weight with respect to 100 parts by weight of the diene rubber (A) serving as the polymer. That is, such range is adopted because of the following reasons: when the blending amount of the organopolysiloxane-modified polypropylene (D) is excessively small, desired sliding performance is not obtained; and in contrast, when the blending amount of the organopolysiloxane-modified polypropylene (D) is excessively large, there is a risk in that physical properties may be degraded.

[Other Materials]

A sulfur vulcanizing agent is generally blended into the anti-vibration rubber composition of the present disclosure in addition to the components (A) to (D). In addition, an unsaturated fatty acid amide is preferably blended as an optional component. Further, a non-radically polymerizable organopolysiloxane, a vulcanization aid, a vulcanization accelerator, an anti-aging agent, a process oil, a processing aid, a reactive monomer, a foaming agent, and the like may be appropriately blended as required.

Examples of the sulfur vulcanizing agent include: sulfur, sulfur chloride, and other forms of sulfur (powdery sulfur, precipitated sulfur, and insoluble sulfur); 2-mercaptoimidazoline; and dipentamethylenethiuram pentasulfide. These sulfur vulcanizing agents may be used alone or in combination thereof.

The blending amount of the sulfur vulcanizing agent preferably falls within the range of from 0.5 parts by weight to 5 parts by weight with respect to 100 parts by weight of the diene rubber (A) serving as the polymer. That is, such range is adopted because of the following reasons: when the blending amount of the vulcanizing agent is excessively small, there is observed such a tendency that a sufficient crosslinked structure is not obtained and hence the dynamic-to-static modulus ratio and permanent set resistance are deteriorated; and in contrast, when the blending amount of the vulcanizing agent is excessively large, there is observed such a tendency that the heat resistance is reduced.

In addition, a case in which the unsaturated fatty acid amide is blended as described above is preferred because, through its bleeding, the sliding property can be enhanced even further, and in particular, initial sliding performance can be effectively improved.

Examples of the unsaturated fatty acid amide include ethylene bis stearamide, erucamide, oleamide, and stearamide. These unsaturated fatty acid amides maybe used alone or in combination thereof. Of these, oleamide is preferred from the viewpoint of effectively improving the initial sliding performance.

The blending amount of the unsaturated fatty acid amide preferably falls within the range of from 1 part by weight to 30 parts by weight with respect to 100 parts by weight of the diene rubber (A) serving as the polymer. That is, such range is adopted because of the following reasons: when the blending amount of the unsaturated fatty acid amide is excessively small, the improving effect on the initial sliding performance is not obtained; and in contrast, when the blending amount of the unsaturated fatty acid amide is excessively large, there is observed such a tendency that the physical properties are degraded, or the dynamic-to-static modulus ratio is deteriorated.

In addition, the backbone of the non-radically polymerizable organopolysiloxane may be any of linear, branched, and cyclic ones, or maybe a mixture thereof. Examples of the kinds of the non-radically polymerizable organopolysiloxane include a polydimethylsiloxane, a polymethylphenylsiloxane, a polymethylhydrogensiloxane, a polyether-modified polydimethylsiloxane, an alkyl-modified polydimethylsiloxane, a higher fatty acid-modified polydimethylsiloxane, a fluorine-modified polydimethylsiloxane, an amino-modified polydimethylsiloxane, an epoxy-modified polydimethylsiloxane, a carbinol-modified polydimethylsiloxane, a carboxyl-modified polydimethylsiloxane, a phenol-modified polydimethylsiloxane, a silanol-modified polydimethylsiloxane, an aralkyl-modified polydimethylsiloxane, and an alkyl-modified polydimethylsiloxane. These organopolysiloxanes may be used alone or in combination thereof.

The blending amount of the non-radically polymerizable organopolysiloxane preferably falls within the range of from 5 parts by weight to 200 parts by weight, more preferably the range of from 10 parts by weight to 100 parts by weight with respect to 100 parts by weight of the organopolysiloxane-modified polypropylene (D).

In addition, examples of the vulcanization aid include a monomethacrylic acid metal salt (e.g., a zinc salt, an aluminum salt, a calcium salt, or a magnesium salt), a dimethacrylic acid metal salt (e.g., a zinc salt, an aluminum salt, a calcium salt, or a magnesium salt), zinc flower (ZnO), stearic acid, and magnesium oxide. These vulcanization aids may be used alone or in combination thereof.

The blending amount of the vulcanization aid preferably falls within the range of from 1 part by weight to 30 parts by weight, more preferably the range of from 3 parts by weight to 10 parts by weight with respect to 100 parts by weight of the diene rubber (A) serving as the polymer.

In addition, examples of the vulcanization accelerator include thiazole-, sulfenamide-, thiuram-, aldehyde ammonia-, aldehyde amine-, guanidine-, and thiourea vulcanization accelerators. These vulcanization accelerators maybe used alone or in combination thereof.

The blending amount of the vulcanization accelerator preferably falls within the range of from 0.1 parts by weight to 10 parts by weight, more preferably the range of from 0.5 parts by weight to 7 parts by weight with respect to 100 parts by weight of the diene rubber (A) serving as the polymer.

Examples of the thiazole vulcanization accelerator include dibenzothiazyl disulfide (MBTS), 2-mercaptobenzothiazole (MBT), sodium 2-mercaptobenzothiazole (NaMBT), and zinc 2-mercaptobenzothiazole (ZnMBT). These vulcanization accelerators may be used alone or in combination thereof.

In addition, examples of the sulfenamide vulcanization accelerator include N-oxydiethylene-2-benzothiazolylsulfenamide (NOBS), N-cyclohexyl-2-benzothiazolylsulfenamide (CBS), N-t-butyl-2-benzothiazolesulfenamide (BBS), and N,N'-dicyclohexyl-2-benzothiazolesulfenamide. These vulcanization accelerators may be used alone or in combination thereof.

In addition, examples of the thiuram vulcanization accelerator include tetramethylthiuram disulfide (TMTD), tetraethylthiuram disulfide (TETD), tetrabutylthiuram disulfide (TBTD), tetrakis(2-ethylhexyl)thiuram disulfide (TOT), and tetrabenzylthiuram disulfide (TBzTD). These vulcanization accelerators may be used alone or in combination thereof.

Examples of the anti-aging agent include a carbamate anti-aging agent, a phenylenediamine anti-aging agent, a phenol anti-aging agent, a diphenylamine anti-aging agent, a quinoline anti-aging agent, an imidazole anti-aging agent, and waxes. These anti-aging agents may be used alone or in combination thereof.

In addition, the blending amount of the anti-aging agent preferably falls within the range of from 0.5 parts by weight to 20 parts by weight, more preferably the range of from 1 part by weight to 10 parts by weight with respect to 100 parts by weight of the diene rubber (A) serving as the polymer.

Examples of the process oil include a naphthene oil, a paraffin oil, and an aromatic oil. These process oils maybe used alone or in combination thereof.

The blending amount of the process oil preferably falls within the range of from 1 part by weight to 50 parts by weight, more preferably the range of from 3 parts by weight to 30 parts by weight with respect to 100 parts by weight of the diene rubber (A) serving as the polymer.

[Method of Preparing Anti-Vibration Rubber Composition]

Herein, the anti-vibration rubber composition of the present disclosure maybe prepared by using the components (A) to (D) serving as its essential materials, and as required, other materials listed above, and kneading those materials through use of a kneading machine, such as a kneader, a Banbury mixer, an open roll, or a twin-screw stirrer.

The anti-vibration rubber composition of the present disclosure provides an anti-vibration rubber (vulcanized body) by being vulcanized at a high temperature (of from 150° C. to 170° C.) for from 5 minutes to 30 minutes. In addition, an anti-vibration rubber member including a sliding contact portion formed of the vulcanized body of the anti-vibration rubber composition of the present disclosure can be suitably used as an anti-vibration rubber member required to have a sliding property, such as a stabilizer bush, suspension bush, engine mount stopper, or coil spring sheet to be used for a vehicle, such as an automobile. The shape of the sliding contact portion depends on the shape of a mating member with which the sliding contact portion is to be brought into sliding contact. Accordingly, for example, when the mating member is something like a metal shaft, the shape of the sliding contact portion is a shape having an insertion hole for inserting the metal shaft. In addition, any such anti-vibration rubber member can eliminate a reduction in sliding property due to a temperature environment or continuous use without causing the deterioration of the dynamic-to-static modulus ratio, and can effectively suppress an increase in frictional resistance against the mating member. Accordingly, a problem in, for example, that an abnormal noise (stick-slip noise) is generated at the time of sliding to degrade the ride comfort of the vehicle can be eliminated.

EXAMPLES

Next, Examples are described together with Comparative Examples. However, the present disclosure is not limited to these Examples.

First, prior to the Examples and Comparative Examples, the following materials were prepared.

[NR]
Natural Rubber
[Unsaturated Fatty Acid Amide]
Oleamide (manufactured by Lion Akzo Co., Ltd., ARMOSLIP CP-P, melting point: 70° C.)
[Sliding Agent 1]
Organopolysiloxane-modified polypropylene (manufactured by Riken Vitamin Co., Ltd., SG-271P, melting point: 125° C.) obtained through chemical bonding between a polypropylene resin and an organopolysiloxane having a radically polymerizable functional group
[Sliding Agent 2]
Organopolysiloxane-modified polypropylene (manufactured by Riken Vitamin Co., Ltd., SG-370P, melting point: 85° C.) obtained through chemical bonding between a polypropylene resin and an organopolysiloxane having a radically polymerizable functional group
[Sliding Agent 3]
Organopolysiloxane-modified polypropylene (manufactured by Riken Vitamin Co., Ltd., SG-471P, melting point: 145° C.) obtained through chemical bonding between a polypropylene resin and an organopolysiloxane having a radically polymerizable functional group

[Sliding Agent 4]

Organopolysiloxane-modified polypropylene (manufactured by Riken Vitamin Co., Ltd., SG-571P, melting point: 135° C.) obtained through chemical bonding between a polypropylene resin and an organopolysiloxane having a radically polymerizable functional group

[Sliding Agent 5]

Organopolysiloxane-modified polypropylene (manufactured by Riken Vitamin Co., Ltd., SG-671P, melting point: 65° C.) obtained through chemical bonding between a polypropylene resin and an organopolysiloxane having a radically polymerizable functional group

[Carbon Black]

FEF grade carbon black (manufactured by Tokai Carbon Co., Ltd., SEAST SO)

[Silica 1]

Manufactured by Tosoh Silica Corporation, Nipsil VN3, BET specific surface area: 200 $m^2/g$

[Silica 2]

Manufactured by Tosoh Silica Corporation, Nipsil ER, BET specific surface area: 100 $m^2/g$

[Clay]

Manufactured by Imerys S.A., Eckalite 1, BET specific surface area: 18 $m^2/g$

[Calcium Carbonate 1]

Manufactured by Shiraishi Calcium Kaisha, Ltd., HAKUENKA CC, BET specific surface area: 27 $m^2/g$

[Calcium Carbonate 2]

Manufactured by Shiraishi Calcium Kaisha, Ltd., WHITON SB,

BET specific surface area: 1 $m^2/g$

[Vulcanizing Agent (Sulfur)]

Manufactured by Karuizawa Refinery

[Vulcanization Accelerator]

N-Cyclohexyl-2-benzothiazolylsulfenamide (CBS) (NOCCELERCZ, manufactured by Ouchi Shinko Chemical Industrial Co., Ltd.)

[Zinc Oxide]

Manufactured by Sakai Chemical Industry Co., Ltd., zinc oxide type 2

[Process Oil]

Naphthene process oil (manufactured by Idemitsu Kosan Co., Ltd., Diana Process NM-280)

[Stearic Acid]

Manufactured by Kao Corporation, LUNAC S30

[Anti-Aging Agent 1]

N-isopropyl-N'-phenyl-p-phenylenediamine (manufactured by Seiko Chemical Co., Ltd., OZONONE 3C)

[Anti-Aging Agent 2]

2,2,4-Trimethyl-1,2-dihydroquinoline (manufactured by Seiko Chemical Co., Ltd., NONFLEX RD)

Examples 1 to 12 and Comparative Examples 1 to 8

The above-mentioned materials were blended at ratios shown in Table 1 and Table 2 below, and were kneaded to prepare anti-vibration rubber compositions. The kneading was performed by first kneading the materials except for the vulcanizing agent and the vulcanization accelerator at 140° C. for 5 minutes through use of a Banbury mixer, and then blending the vulcanizing agent and the vulcanization accelerator, followed by kneading at 60° C. for 5 minutes through use of an open roll.

The evaluations of various properties were performed by using the anti-vibration rubber compositions of the Examples and Comparative Examples thus obtained in accordance with the following criteria. The results are also shown in Table 1 and Table 2 below. In Table 1 and Table 2 below, there are shown index evaluations of measured values for samples of the Examples and Comparative Examples in the case where a measured value for a sample serving as a product of Comparative Example 1 is used as a reference. In addition, in all the index evaluations in Table 1 and Table 2 below, a case falling within the range of from 1 to 4 was indicated with Symbol "×" (unacceptable product), a case falling within the range of from 5 to 7 was indicated with Symbol "Δ" (acceptable product), and a case falling within the range of from 8 to 10 was indicated with Symbol "○" (excellent product).

<<Friction Coefficient>>

[Initial, at High Temperature, and at Low Temperature]

Each of the anti-vibration rubber compositions was used and vulcanized under the conditions of 150° C.×20 minutes to produce a rubber sheet having a thickness of 2 mm. Then, the rubber sheet was used and measured for its dynamic friction coefficient (μk) in conformity with JIS K 7125. In the measurement, a value measured first at 25° C. was defined as an "initial" value, a value measured for the above-mentioned rubber sheet that had been left to stand at 80° C. for 0.5 hours was defined as a value "at high temperature", and a value measured for the above-mentioned rubber sheet that had been subjected to washing of the surface of the sheet with isopropanol (IPA) and then left to stand at 0° C. for 0.5 hours was defined as a value "at low temperature".

Then, the "initial" measured value, the measured value "at high temperature", and the measured value "at low temperature" for the dynamic friction coefficient of the sample serving as the product of Comparative Example 1 were each used as a reference value, and respective measured values for the dynamic friction coefficients of the samples of the Examples and Comparative Examples were each shown as an index with respect to the reference value. That is, a sample showing a dynamic friction coefficient equal to or higher than the reference value was evaluated as "1", a sample showing a dynamic friction coefficient 0.9 times or more and less than 1 time the reference value was evaluated as "2", a sample showing a dynamic friction coefficient 0.8 times or more and less than 0.9 times the reference value was evaluated as "3", a sample showing a dynamic friction coefficient 0.7 times or more and less than 0.8 times the reference value was evaluated as "4", a sample showing a dynamic friction coefficient 0.6 times or more and less than 0.7 times the reference value was evaluated as "5", a sample showing a dynamic friction coefficient 0.5 times or more and less than 0.6 times the reference value was evaluated as "6", a sample showing a dynamic friction coefficient 0.4 times or more and less than 0.5 times the reference value was evaluated as "7", a sample showing a dynamic friction coefficient 0.3 times or more and less than 0.4 times the reference value was evaluated as "8", a sample showing a dynamic friction coefficient 0.2 times or more and less than 0.3 times the reference value was evaluated as "9", and a sample showing a dynamic friction coefficient 0.1 times or more and less than 0.2 times the reference value was evaluated as "10".

[Repeatability]

In addition, the measurement of the dynamic friction coefficient (μk) at 25° C. described above was repeatedly performed five times, and then the ratio of an increase from the "initial" dynamic friction coefficient (μk) value was defined as "repeatability".

Then, as a result of the above-mentioned repetition test, a sample unchanged from the "initial" dynamic friction coefficient ($\mu k$) value, or showing an increase in dynamic friction coefficient to a value less than 1.1 times the "initial" dynamic friction coefficient ($\mu k$) was evaluated as "10", a sample showing a value 1.1 times or more and less than 1.2 times the "initial" dynamic friction coefficient ($\mu k$) value was evaluated as "9", a sample showing a value 1.2 times or more and less than 1.3 times the "initial" dynamic friction coefficient ($\mu k$) value was evaluated as "8", a sample showing a value 1.3 times or more and less than 1.4 times the "initial" dynamic friction coefficient ($\mu k$) value was evaluated as "7", a sample showing a value 1.4 times or more and less than 1.5 times the "initial" dynamic friction coefficient ($\mu k$) value was evaluated as "6", a sample showing a value 1.5 times or more and less than 1.6 times the "initial" dynamic friction coefficient ($\mu k$) value was evaluated as "5", a sample showing a value 1.6 times or more and less than 1.7 times the "initial" dynamic friction coefficient ($\mu k$) value was evaluated as "4", a sample showing a value 1.7 times or more and less than 1.8 times the "initial" dynamic friction coefficient ($\mu k$) value was evaluated as "3", a sample showing a value 1.8 times or more and less than 1.9 times the "initial" dynamic friction coefficient ($\mu k$) value was evaluated as "2", and a sample showing a value 1.9 or more times the "initial" dynamic friction coefficient ($\mu k$) value was evaluated as "1".

<<Spring Property>>

Each of the anti-vibration rubber compositions was vulcanized under the conditions of 150° C.×20 minutes to produce a vulcanized rubber sheet having a thickness of 2 mm. A strip-shaped test piece measuring 5 mm wide by 30 mm long was cut out of the sheet, and was measured for each of a storage elastic modulus (E'100 Hz) at a frequency of 100 Hz and a strain of 0.05% and a storage elastic modulus (E') at a frequency of 15 Hz and a strain of 4.5% using Rheogel-E4000 manufactured by UBM at room temperature (25° C.). Then, a dynamic-to-static modulus ratio (E'100 Hz/E') was shown as a spring property.

Then, each of the dynamic-to-static modulus ratios of the samples of the Examples and Comparative Examples in the case where the dynamic-to-static modulus ratio of the sample serving as the product of Comparative Example 1 was used as a reference value was shown as an index. That is, a sample showing a dynamic-to-static modulus ratio equal to or lower than the reference value was evaluated as "10", a sample showing a dynamic-to-static modulus ratio increased by less than 5% of the reference value was evaluated as "9", a sample showing a dynamic-to-static modulus ratio increased by 5% or more and less than 10% of the reference value was evaluated as "8", a sample showing a dynamic-to-static modulus ratio increased by 10% or more and less than 15% of the reference value was evaluated as "7", a sample showing a dynamic-to-static modulus ratio increased by 15% or more and less than 20% of the reference value was evaluated "6", a sample showing a dynamic-to-static modulus ratio increased by 20% or more and less than 25% of the reference value was evaluated as "5", a sample showing a dynamic-to-static modulus ratio increased by 25% or more and less than 30% of the reference value was evaluated as "4", a sample showing a dynamic-to-static modulus ratio increased by 35% or more and less than 40% of the reference value was evaluated as "3", a sample showing a dynamic-to-static modulus ratio increased by 45% or more and less than 50% of the reference value was evaluated as "2", and a sample showing a dynamic-to-static modulus ratio increased by 50% or more of the reference value was evaluated as "1".

TABLE 1

| | | | | | Example | | | | | | | | (part(s) by weight) |
|---|---|---|---|---|---|---|---|---|---|---|---|---|---|
| | | 1 | 2 | 3 | 4 | 5 | 6 | 7 | 8 | 9 | 10 | 11 | 12 |
| NR | | 100 | 100 | 100 | 100 | 100 | 100 | 100 | 100 | 100 | 100 | 100 | 100 |
| Unsaturated fatty acid amide | | — | — | — | — | — | 5 | 5 | 5 | 5 | 5 | 5 | 5 |
| Sliding agent 1 | | 10 | — | — | — | — | — | — | — | — | — | — | — |
| Sliding agent 2 | | — | 10 | — | — | — | — | — | — | — | — | — | — |
| Sliding agent 3 | | — | — | 10 | — | — | — | — | — | — | — | — | — |
| Sliding agent 4 | | — | — | — | 10 | — | 10 | 10 | 10 | 10 | 10 | 10 | 10 |
| Sliding agent 5 | | — | — | — | — | 10 | — | — | — | — | — | — | — |
| Carbon black | | 50 | 50 | 50 | 50 | 50 | 50 | 50 | 50 | 50 | 50 | 50 | 50 |
| Silica 1 | | 3 | 3 | 3 | 3 | 3 | 3 | 0.1 | 10 | — | — | — | — |
| Silica 2 | | — | — | — | — | — | — | — | — | 3 | — | — | — |
| Clay | | — | — | — | — | — | — | — | — | — | 3 | — | — |
| Calcium carbonate 1 | | — | — | — | — | — | — | — | — | — | — | 3 | — |
| Calcium carbonate 2 | | — | — | — | — | — | — | — | — | — | — | — | 3 |
| Vulcanizing agent (sulfur) | | 2 | 2 | 2 | 2 | 2 | 2 | 2 | 2 | 2 | 2 | 2 | 2 |
| Vulcanization accelerator | | 1 | 1 | 1 | 1 | 1 | 1 | 1 | 1 | 1 | 1 | 1 | 1 |
| Zinc oxide | | 5 | 5 | 5 | 5 | 5 | 5 | 5 | 5 | 5 | 5 | 5 | 5 |
| Process oil | | 3 | 3 | 3 | 3 | 3 | 3 | 3 | 3 | 3 | 3 | 3 | 3 |
| Stearic acid | | 1 | 1 | 1 | 1 | 1 | 1 | 1 | 1 | 1 | 1 | 1 | 1 |
| Anti-aging agent 1 | | 1 | 1 | 1 | 1 | 1 | 1 | 1 | 1 | 1 | 1 | 1 | 1 |
| Anti-aging agent 2 | | 1 | 1 | 1 | 1 | 1 | 1 | 1 | 1 | 1 | 1 | 1 | 1 |
| Friction coefficient | Initial | 5 | 5 | 5 | 6 | 5 | 10 | 10 | 10 | 10 | 10 | 10 | 10 |
| | Evaluation | Δ | Δ | Δ | Δ | Δ | ○ | ○ | ○ | ○ | ○ | ○ | ○ |
| | At high temperature | 5 | 5 | 5 | 6 | 5 | 7 | 7 | 7 | 7 | 7 | 7 | 7 |
| | Evaluation | Δ | Δ | Δ | Δ | Δ | Δ | Δ | Δ | Δ | Δ | Δ | Δ |
| | At low temperature | 5 | 5 | 5 | 6 | 5 | 7 | 7 | 7 | 7 | 7 | 7 | 7 |
| | Evaluation | Δ | Δ | Δ | Δ | Δ | Δ | Δ | Δ | Δ | Δ | Δ | Δ |
| | Repeatability | 7 | 7 | 7 | 7 | 6 | 10 | 9 | 10 | 9 | 9 | 9 | 8 |
| | Evaluation | Δ | Δ | Δ | Δ | Δ | ○ | ○ | ○ | ○ | ○ | ○ | ○ |
| Spring property | | 9 | 10 | 8 | 9 | 10 | 8 | 9 | 6 | 9 | 9 | 10 | 10 |
| Evaluation | | ○ | ○ | ○ | ○ | ○ | ○ | ○ | Δ | ○ | ○ | ○ | ○ |

TABLE 2

| | Comparative Example (part(s) by weight) | | | | | | | |
|---|---|---|---|---|---|---|---|---|
| | 1 | 2 | 3 | 4 | 5 | 6 | 7 | 8 |
| NR | 100 | 100 | 100 | 100 | 100 | 100 | 100 | 100 |
| Unsaturated fatty acid amide | — | 5 | — | — | — | — | — | 5 |
| Sliding agent 1 | — | — | 10 | — | — | — | — | — |
| Sliding agent 2 | — | — | — | 10 | — | — | — | — |
| Sliding agent 3 | — | — | — | — | 10 | — | — | — |
| Sliding agent 4 | — | — | — | — | — | 10 | — | 10 |
| Sliding agent 5 | — | — | — | — | — | — | 10 | — |
| Carbon black | 50 | 50 | 50 | 50 | 50 | 50 | 50 | 50 |
| Silica 1 | — | — | — | — | — | — | — | 20 |
| Silica 2 | — | — | — | — | — | — | — | — |
| Clay | — | — | — | — | — | — | — | — |
| Calcium carbonate 1 | — | — | — | — | — | — | — | — |
| Calcium carbonate 2 | — | — | — | — | — | — | — | — |
| Vulcanizing agent (sulfur) | 2 | 2 | 2 | 2 | 2 | 2 | 2 | 2 |
| Vulcanization accelerator | 1 | 1 | 1 | 1 | 1 | 1 | 1 | 1 |
| Zinc oxide | 5 | 5 | 5 | 5 | 5 | 5 | 5 | 5 |
| Process oil | 3 | 3 | 3 | 3 | 3 | 3 | 3 | 3 |
| Stearic acid | 1 | 1 | 1 | 1 | 1 | 1 | 1 | 1 |
| Anti-aging agent 1 | 1 | 1 | 1 | 1 | 1 | 1 | 1 | 1 |
| Anti-aging agent 2 | 1 | 1 | 1 | 1 | 1 | 1 | 1 | 1 |
| Friction coefficient Initial | 1 | 9 | 4 | 4 | 3 | 4 | 3 | 10 |
| Evaluation | x | ○ | x | x | x | x | x | ○ |
| At high temperature | 1 | 3 | 4 | 4 | 3 | 4 | 2 | 7 |
| Evaluation | x | x | x | x | x | x | x | Δ |
| At low temperature | 1 | 2 | 4 | 4 | 3 | 4 | 4 | 7 |
| Evaluation | x | x | x | x | x | x | x | Δ |
| Repeatability | 10 | 4 | 7 | 7 | 7 | 7 | 7 | 10 |
| Evaluation | ○ | x | Δ | Δ | Δ | Δ | Δ | ○ |
| Spring property | 10 | 5 | 9 | 10 | 8 | 9 | 10 | 4 |
| Evaluation | ○ | Δ | ○ | ○ | ○ | ○ | ○ | x |

As apparent from the results shown in Table 1, none of the anti-vibration rubber compositions of the Examples has an evaluation of "x". That is, it is found that each of the anti-vibration rubber compositions of the Examples has its dynamic-to-static modulus ratio suppressed to be low, and hence is excellent in spring property serving as an anti-vibration property, and besides, does not show an increase in dynamic friction coefficient due to a temperature environment or continuous use, thus exhibiting high sliding performance.

In contrast, the anti-vibration rubber composition of Comparative Example 1 does not contain any sliding agent, and hence has a high friction coefficient as compared to other Comparative Examples and Examples. The anti-vibration rubber composition of Comparative Example 2 contains an unsaturated fatty acid amide, and hence has a low initial friction coefficient, but shows increases in friction coefficient due to the high-temperature environment and the low-temperature environment, and is also poor in repeatability evaluation based on the above-mentioned criteria. Each of the anti-vibration rubber compositions of Comparative Examples 3 to 7 contains a specific organopolysiloxane-modified polypropylene as a sliding agent, and hence is excellent in repeatability evaluation and spring property evaluation based on the above-mentioned criteria, but has a high initial friction coefficient, and also shows increases in friction coefficient due to the high-temperature environment and the low-temperature environment. The anti-vibration rubber composition of Comparative Example 8 contains a specific organopolysiloxane-modified polypropylene as a sliding agent and also contains silica, but shows a reduction in spring property because the content of the silica is excessively large.

In the Examples described above, specific embodiments in the present disclosure have been described. However, the Examples described above are merely illustrative and should not be construed as being limitative. Various modifications apparent to a person skilled in the art are meant to be within the scope of the present disclosure.

The vulcanized rubber composition of the present disclosure can be suitably used as a material for forming an anti-vibration rubber member required to have a sliding property, such as a stabilizer bush, suspension bush, engine mount stopper, or coil spring sheet to be used for a vehicle, such as an automobile.

The invention claimed is:

1. An anti-vibration rubber composition, comprising:
   (A) a diene rubber;
   (B) carbon black;
   (C) a white filler; and
   (D) a sliding agent comprising an organopolysiloxane-modified polypropylene,
   wherein a content of the component (C) with respect to 100 parts by weight of the component (A) falls within a range of from 0.1 parts by weight to 10 parts by weight.

2. The anti-vibration rubber composition according to claim 1, wherein the organopolysiloxane-modified polypropylene is obtained through chemical bonding between a polypropylene resin and an organopolysiloxane having a radically polymerizable functional group.

3. The anti-vibration rubber composition according to claim 1, wherein the organopolysiloxane-modified polypropylene is obtained through chemical bonding between each of a polypropylene resin and a polypropylene wax, and an organopolysiloxane having a radically polymerizable functional group.

4. The anti-vibration rubber composition according to claim 1, wherein the organopolysiloxane-modified polypropylene has a melting point of 150° C. or less.

5. The anti-vibration rubber composition according to claim 1, further comprising an unsaturated fatty acid amide.

6. The anti-vibration rubber composition according to claim 1, wherein the white filler (C) comprises silica.

7. The anti-vibration rubber composition according to claim 1, wherein the white filler (C) has a BET specific surface area in a range of from 15 $m^2/g$ to 250 $m^2/g$.

8. An anti-vibration rubber member, comprising:
a sliding contact portion configured to be brought into sliding contact with a mating member,
wherein at least the sliding contact portion is formed of a vulcanized body of the anti-vibration rubber composition of claim 1.

* * * * *